(12) United States Patent
Gunbas et al.

(10) Patent No.: US 11,260,638 B2
(45) Date of Patent: Mar. 1, 2022

(54) TRANSPARENT, FLEXIBLE, IMPACT RESISTANT, MULTILAYER FILM COMPRISING POLYCARBONATE COPOLYMERS

(71) Applicant: SABIC GLOBAL TECHNOLOGIES B.V., Bergen op Zoom (NL)

(72) Inventors: Duygu Deniz Gunbas, Bergen op Zoom (NL); Pieter Jan Antoon Janssen, Bergen op Zoom (NL); Nadia Grossiord, Bergen op Zoom (NL); Jong Woo Lee, Gyeonggi-do (KR)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 117 days.

(21) Appl. No.: 16/868,891

(22) Filed: May 7, 2020

(65) Prior Publication Data

US 2021/0060915 A1 Mar. 4, 2021

(30) Foreign Application Priority Data

Aug. 29, 2019 (EP) .................................. 19194425

(51) Int. Cl.
*B32B 27/36* (2006.01)
*B29C 48/18* (2019.01)
(Continued)

(52) U.S. Cl.
CPC ............ *B32B 27/365* (2013.01); *B29C 48/18* (2019.02); *B29K 2067/00* (2013.01);
(Continued)

(58) Field of Classification Search
None
See application file for complete search history.

(56) References Cited

U.S. PATENT DOCUMENTS

| 5,931,764 A | 8/1999 | Freeman et al. |
| 6,020,867 A | 2/2000 | Shimada et al. |
| | (Continued) | |

FOREIGN PATENT DOCUMENTS

| CN | 201035171 Y | 3/2008 |
| CN | 103501576 A | 1/2014 |
| | (Continued) | |

OTHER PUBLICATIONS

Decision to Grant for the corresponding European Application No. 19194425.5; dated May 14, 2021; 31 pages.
(Continued)

*Primary Examiner* — Tae H Yoon
(74) *Attorney, Agent, or Firm* — Cantor Colburn LLP (57) ABSTRACT

A multilayer film can comprise: a plurality of layers, preferably 4 layers to 128 layers, comprising: a polymer A layer comprising a polycarbonate copolymer and a polymer B layer comprising a semi-crystalline polyester; wherein a differential solubility parameter ($\Delta\delta_{AB}$) of polymer A towards polymer B ($\Delta\delta_{AB}$) is greater than or equal to 2.6 MPa$^{1/2}$; and an interdiffusion region between each polymer A and polymer B. The multilayer film has a dynamic flexure of greater than or equal to 200,000 cycles, as determine by bending 180° on a 10 mm radius cylinder at a rate of 1 hertz. The multilayer film has a total thickness of 40 μm to 70 μm, a transmission at 360 nm to 750 nm of greater than or equal to 89% and a haze of less than or equal to 1%.

18 Claims, 3 Drawing Sheets

(51) Int. Cl.
 B29K 67/00 (2006.01)
 B29K 69/00 (2006.01)
(52) U.S. Cl.
 CPC ....... *B29K 2069/00* (2013.01); *B32B 2255/10* (2013.01); *B32B 2307/412* (2013.01); *B32B 2307/546* (2013.01); *B32B 2307/558* (2013.01); *B32B 2307/704* (2013.01); *B32B 2457/20* (2013.01)

(56) References Cited

U.S. PATENT DOCUMENTS

| | | |
|---|---|---|
| 6,728,166 B2 | 4/2004 | Grupp |
| 7,298,072 B2 | 11/2007 | Czeremuszkin et al. |
| 7,495,821 B2 | 2/2009 | Yamakita et al. |
| 8,257,129 B2 | 9/2012 | Oh |
| 8,476,634 B2 | 7/2013 | Jeon et al. |
| 8,953,137 B2 | 2/2015 | Hung et al. |
| 9,012,017 B2 | 4/2015 | Morishima |
| 9,263,698 B2 | 2/2016 | Choi et al. |
| 9,278,497 B2 | 3/2016 | Mori et al. |
| 9,282,614 B2 | 3/2016 | Yang et al. |
| 9,287,336 B2 | 3/2016 | Lin et al. |
| 9,349,778 B2 | 5/2016 | Kim et al. |
| 9,354,476 B2 | 5/2016 | Han et al. |
| 9,419,065 B2 | 8/2016 | Degner et al. |
| 9,431,467 B2 | 8/2016 | Chwu et al. |
| 9,437,831 B2 | 9/2016 | Yamazaki et al. |
| 9,477,346 B2 | 10/2016 | Sirois |
| 9,508,953 B2 | 11/2016 | Sakakura et al. |
| 9,516,743 B2 | 12/2016 | Kim et al. |
| 9,541,965 B1 | 1/2017 | Mukherjee et al. |
| 9,564,605 B2 | 2/2017 | Jung et al. |
| 9,614,168 B2 | 4/2017 | Zhang et al. |
| 9,655,235 B2 | 5/2017 | Hwang et al. |
| 9,661,114 B2 | 5/2017 | Jeong et al. |
| 9,666,813 B2 | 5/2017 | Lee |
| 9,668,318 B2 | 5/2017 | Choi et al. |
| 9,741,961 B2 | 8/2017 | Kim et al. |
| 9,753,195 B2 | 9/2017 | De Jong et al. |
| 9,780,318 B2 | 10/2017 | Johnson et al. |
| 9,791,981 B2 | 10/2017 | Kang |
| 9,805,630 B2 | 10/2017 | Franklin et al. |
| 9,817,444 B2 | 11/2017 | Raff et al. |
| 9,825,103 B2 | 11/2017 | Rappoport et al. |
| 9,843,014 B2 | 12/2017 | Xu et al. |
| 9,853,244 B2 | 12/2017 | Kamiya |
| 9,864,127 B2 | 1/2018 | Aikio et al. |
| 9,866,660 B2 | 1/2018 | Myers et al. |
| 10,191,516 B2 | 1/2019 | Jang et al. |
| 2006/0139335 A1 | 6/2006 | Brower et al. |
| 2007/0099356 A1 | 5/2007 | Park et al. |
| 2009/0218943 A1 | 9/2009 | Nishimura et al. |
| 2009/0322999 A1 | 12/2009 | Sano et al. |
| 2010/0046078 A1 | 2/2010 | Kirimoto et al. |
| 2013/0083496 A1 | 4/2013 | Franklin et al. |
| 2013/0319897 A1 | 12/2013 | Hsu |
| 2014/0065326 A1 | 3/2014 | Lee et al. |
| 2014/0097417 A1 | 4/2014 | Lin et al. |
| 2014/0168510 A1 | 6/2014 | Hamada et al. |
| 2014/0353874 A1 | 12/2014 | Han |
| 2015/0004334 A1 | 1/2015 | Bae et al. |
| 2015/0015807 A1 | 1/2015 | Franke et al. |
| 2015/0072125 A1 | 3/2015 | Murashige et al. |
| 2015/0169281 A1 | 6/2015 | Dixon et al. |
| 2015/0268697 A1 | 9/2015 | Nam et al. |
| 2015/0296063 A1 | 10/2015 | Reeves |
| 2015/0296622 A1 | 10/2015 | Jiang et al. |
| 2015/0346872 A1 | 12/2015 | Hwang et al. |
| 2016/0011689 A1 | 1/2016 | Kim et al. |
| 2016/0014881 A1 | 1/2016 | Shin et al. |
| 2016/0039183 A1 | 2/2016 | Murashige et al. |
| 2016/0043336 A1 | 2/2016 | Kim et al. |
| 2016/0048171 A1 | 2/2016 | Lee et al. |
| 2016/0104865 A1 | 4/2016 | Jung et al. |
| 2016/0105950 A1 | 4/2016 | Zhang et al. |
| 2016/0259092 A1 | 9/2016 | Shibata et al. |
| 2016/0270210 A1 | 9/2016 | Shin |
| 2016/0316575 A1 | 10/2016 | Lee |
| 2016/0378246 A1 | 12/2016 | Kim |
| 2017/0012095 A1 | 1/2017 | Zhong et al. |
| 2017/0038523 A1 | 2/2017 | Ochi et al. |
| 2017/0040400 A1 | 2/2017 | Eguchi et al. |
| 2017/0040569 A1 | 2/2017 | Watabe et al. |
| 2017/0092884 A1 | 3/2017 | Zhang et al. |
| 2017/0153668 A1 | 6/2017 | Jang et al. |
| 2017/0156227 A1 | 6/2017 | Heo et al. |
| 2017/0170417 A1 | 6/2017 | Myung et al. |
| 2017/0179424 A1 | 6/2017 | Lee et al. |
| 2017/0183255 A1 | 6/2017 | Walther et al. |
| 2017/0210104 A1 | 7/2017 | Doo et al. |
| 2017/0229664 A1 | 8/2017 | Watabe et al. |
| 2017/0247579 A1 | 8/2017 | Kwak et al. |
| 2017/0253746 A1 | 9/2017 | Lim et al. |
| 2017/0253747 A1 | 9/2017 | Lim et al. |
| 2017/0263889 A1 | 9/2017 | Seki et al. |
| 2017/0294610 A1 | 10/2017 | Sasaki |
| 2017/0309867 A1 | 10/2017 | Mun et al. |
| 2017/0324058 A1 | 11/2017 | Min |
| 2017/0335114 A1 | 11/2017 | Lee |
| 2017/0335136 A1 | 11/2017 | Lee |
| 2017/0338291 A1 | 11/2017 | Ishii |
| 2017/0338441 A1 | 11/2017 | Higano |
| 2018/0004254 A1 | 1/2018 | Park et al. |
| 2018/0007747 A1 | 1/2018 | Jung et al. |
| 2018/0011351 A1 | 1/2018 | Yamazaki et al. |
| 2018/0034001 A1 | 2/2018 | Hwang et al. |
| 2018/0046220 A1 | 2/2018 | Kim et al. |
| 2018/0081088 A1 | 3/2018 | Hwang et al. |
| 2018/0088392 A1 | 3/2018 | Park et al. |
| 2018/0096635 A1 | 4/2018 | Park et al. |
| 2018/0178494 A1 | 6/2018 | Kim et al. |
| 2018/0187051 A1 | 7/2018 | Won et al. |
| 2019/0022980 A1 | 1/2019 | Chu et al. |
| 2019/0051223 A1 | 2/2019 | Li et al. |
| 2019/0051705 A1 | 2/2019 | Breedlove et al. |
| 2019/0109298 A1 | 4/2019 | Ishida et al. |
| 2019/0350092 A1 | 11/2019 | Jung et al. |

FOREIGN PATENT DOCUMENTS

| | | |
|---|---|---|
| CN | 203504877 U | 3/2014 |
| CN | 104808857 A | 7/2015 |
| CN | 106328003 B | 10/2017 |
| EP | 3438787 A1 | 2/2019 |
| JP | H11327448 A | 11/1999 |
| JP | 2001264736 A | 9/2001 |
| JP | 2003249670 A | 9/2003 |
| JP | 2004281529 A | 10/2004 |
| JP | 2005244139 A | 9/2005 |
| JP | 2005326713 A | 11/2005 |
| JP | 2008304760 A | 12/2008 |
| JP | 2009003451 A | 1/2009 |
| JP | 2009274256 A | 11/2009 |
| JP | 2011059834 A | 3/2011 |
| JP | 2011108564 A | 6/2011 |
| JP | 2017032939 A | 2/2017 |
| JP | 2017050071 A | 3/2017 |
| JP | 2018022062 A | 2/2018 |
| KR | 100647705 B1 | 11/2006 |
| KR | 101439261 B1 | 9/2014 |
| KR | 20150050715 A | 5/2015 |
| KR | 101697049 B1 | 1/2017 |
| KR | 20170023231 A | 3/2017 |
| KR | 20170070917 A | 6/2017 |
| KR | 20170072973 A | 6/2017 |
| KR | 101800066 B1 | 11/2017 |
| KR | 20180096449 A | 8/2018 |
| WO | 2015163681 A1 | 10/2015 |
| WO | 2016039125 A1 | 3/2016 |
| WO | 2016042727 A1 | 3/2016 |
| WO | 2017057958 A1 | 4/2017 |
| WO | 2017086338 A1 | 5/2017 |
| WO | 2017116103 A1 | 7/2017 |

(56) References Cited

FOREIGN PATENT DOCUMENTS

| WO | 2017119627 A1 | 7/2017 |
|---|---|---|
| WO | 2017123899 A1 | 7/2017 |
| WO | 2017136507 A1 | 8/2017 |
| WO | 2018015922 A1 | 1/2018 |
| WO | 2018015932 A1 | 1/2018 |
| WO | 2018070523 A1 | 4/2018 |
| WO | 2018080034 A1 | 5/2018 |
| WO | 2018102607 A1 | 6/2018 |
| WO | 2018186262 A1 | 10/2018 |
| WO | 2019038640 A1 | 2/2019 |

OTHER PUBLICATIONS

European Search Report for the corresponding European Application No. 19194425; dated Feb. 14, 2020; 5 pages.

TRANSPARENT, FLEXIBLE, IMPACT RESISTANT, MULTILAYER FILM COMPRISING POLYCARBONATE COPOLYMERS

CROSS-REFERENCE TO RELATED APPLICATION

This application claims priority to and the benefit of EP Application No. 19194425.5, filed Aug. 29, 2019, the contents of which are incorporated herein by reference in their entirety.

BACKGROUND

Multilayer polymer films can provide desirable properties such as transparency in numerous products and applications. Unfortunately, these films can become hazy or cracked when bent or when impacted (e.g., due to dropping the product, or dropping something on the film).

WO 2018/142282 is directed to method of forming a microneedle array having alternating layers of material includes transforming a multilayer sheet by cutting, assembling and stretching steps to form a stretched, stacked multilayer sheet. The stretched, stacked multilayer sheet is cut, assembled and stretched to form a film, the film is heated, and at least a portion of the film is caused to be displaced into a plurality of recesses thereby forming a plurality of protrusions at a surface of the film.

WO 2018/015932 is directed to a multilayer article can comprise: a multilayer substrate M, comprising: greater than or equal to 16 polymer A layers; and greater than or equal to 16 polymer B layers; wherein the polymer A layers and the polymer B layers are present in a ratio of 1:4 to 4:1; a protective layer P; and an identification layer I between the protective layer P and the multilayer substrate M; wherein the identification layer I comprises information, and wherein the protective layer P prevents alteration thereof.

WO 2018/015922 is directed to a multilayer structure can comprise: an outermost layer; a sensor; a multilayer substrate A located between the sensor and the outermost layer, the multilayer substrate, comprising greater than or equal to 16 polymer A layers; and greater than or equal to 16 polymer B layers; wherein the polymer A layers and the polymer B layers are present in a ratio of 1:4 to 4:1; wherein the multilayer substrate has a transmission of greater than or equal to 70%; wherein the structure has a water vapor transmission rate of less than or equal to 10 grams per cubic centimeter per day (g/cc/day).

It would be desirable to provide an improved multilayer film, e.g., that can be bent and that is impact resistant (or has impact resistance), and especially a transparent multilayer film that has a thickness of less than 100 micrometers (μm).

BRIEF DESCRIPTION

Disclosed herein are multilayer films, such as flexible multilayer films, methods of making multilayer films, and articles made therefrom.

In one embodiment, a multilayer film can comprise: a plurality of layers, preferably 4 layers to 128 layers, The plurality of layers can comprise: (a) a polymer A layer comprising a polycarbonate copolymer wherein the polycarbonate copolymer comprises at least one of: a copolymer of polycarbonate and iso- and terephthalate esters of resorcinol at a weight ratio of the iso- and terephthalate esters of resorcinol to the bisphenol A polycarbonate of 20/80; or copolymer comprising bisphenol A carbonate units and 2-phenyl-3,3'-bis(4-hydroxyphenyl) phthalimidine carbonate units; and a polymer B layer comprising a semi-crystalline polyester; and (b) an interdiffusion region between each polymer A and polymer B; wherein a differential solubility parameter ($\Delta\delta_{AB}$) of polymer A towards polymer B ($\Delta\delta_{AB}$) is 2.6 MPa$^{1/2}$ ≤ $\Delta\delta_{AB}$ ≤ 3.0 MPa$^{1/2}$; and wherein the polycarbonate copolymer and the semi-crystalline polyester commingle at an interface of polymer A layer and polymer B layer. The multilayer film has a total thickness of 40 μm to 80 μm, preferably 40 μm to 70 μm.

In one embodiment, a method for producing the multilayer film can comprise: (i) coextruding polymer A and polymer B; splitting the coextruded polymer A and polymer B to obtain two or more sub-streams; repositioning the sub-streams in an overlapping manner, and contacting the sub-streams to obtain alternating layers of polymer A and polymer B; and repeating the preceding steps until the desired number of layers has been attained, and passing the stream through a die to produce the multilayer film; or (ii) separately extruding polymer A and polymer B to form individual polymer streams A and B; splitting the individual polymer streams A and B into more than 3 sub-streams, and recombining the sub-streams to form a recombined stream, alternating between the A and B sub-streams; and passing the recombined stream through a die to produce the multilayer film.

In one embodiment, the multilayer film is used in an electronic device that has a dynamic flexure of greater than or equal to 200,000 cycles, as determine by bending 180° on a 10 mm radius cylinder at a rate of 1 hertz.

The above described and other features are exemplified by the following figures, detailed description, claims, and examples.

BRIEF DESCRIPTION OF THE DRAWINGS

The following figures are exemplary embodiments wherein the like elements are numbered alike.

The above described and other features are exemplified by the following detailed description, examples, and claims.

DETAILED DESCRIPTION

The present invention has been developed in view of the aforementioned problems in the prior art and, is intended to provide a multilayered film exhibiting unique combination of optical, dynamic flexibility, and impact performance with robust temperature stability. These properties make the multilayered film particularly useful for applications requiring flexure, and for foldable applications, e.g., for flexible cover lens for foldable displays. It was surprisingly found that the desired combination of optical, dynamic flexibility, and impact performance with robust temperature stability could be attained with a polymer A layer comprising a polycarbonate copolymer wherein the polycarbonate copolymer comprises at least one of: a copolymer of polycarbonate and iso- and terephthalate esters of resorcinol at a weight ratio of the iso- and terephthalate esters of resorcinol to the bisphenol A polycarbonate of 20/80; or copolymer comprising bisphenol A carbonate units and 2-phenyl-3,3'- bis(4-hydroxyphenyl) phthalimidine carbonate units; and a polymer B layer comprising a semi-crystalline polyester; wherein a differential solubility parameter ($\Delta\delta_{AB}$) of polymer A towards polymer B ($\Delta\delta_{AB}$) is 2.6 MPa$^{1/2}$≤$\Delta\delta_{AB}$≤3.0 MPa$^{1/2}$; and wherein where there is contact between polymer layer A and polymer layer B, an interdiffusion region is formed comprising both the polycarbonate copolymer and the semi-crystalline polyester. In other words, commingling occurs at an interface of polymer A layer and polymer B layer such that an interdiffusion region is formed.

As used herein, "differential solubility parameter" ($\Delta\delta_{AB}$) can be calculated by Formula (1):

$$\Delta\delta_{AB} = [(\delta_{HA} - \delta_{HB})^2 + (\delta_{vA} - \delta_{vB})^2]^{1/2} \quad \text{Formula (1)}$$

where $\delta_{HA}$ is the Hansen hydrogen bonding solubility parameter of polymer A, $\delta_{vA}$ is the Hansen non-hydrogen bonding solubility parameter of polymer A, $\delta_{HB}$ is the Hansen hydrogen bonding solubility parameter of polymer B, $\delta_{vB}$ is the Hansen non-hydrogen bonding solubility parameter of polymer B. The Hansen non-hydrogen bonding solubility parameter of polymer A ($\delta_{vA}$) can be calculated by Formula (2):

$$\delta_{vA} = (\delta_{pA}^2 + \delta_{dA}^2)^{1/2} \quad \text{Formula (2)}$$

where $\delta_{pA}$ is the Hansen polar solubility parameter of polymer A and $\delta_{dA}$ is the Hansen dispersive solubility parameter of polymer A. The Hansen non-hydrogen bonding solubility parameter of polymer B ($\delta_{vB}$) can be calculated by Formula (3):

$$\delta_{vB} = (\delta_{pB}^2 + \delta_{dB}^2)^{1/2} \quad \text{Formula (3)}$$

where $\delta_{pB}$ is the Hansen polar solubility parameter of polymer B and $\delta_{dB}$ is the Hansen dispersive solubility parameter of polymer B. The Hansen polar solubility parameter, Hansen dispersive solubility parameter, and the Hansen hydrogen solubility parameter can be calculated by the van Krevelen group contribution method as described in van Krevelen, D. W., "*Prediction of Solubility-Parameter Components*", K. T. Nijenhuis (Ed.), Properties of Polymers, Elsevier, Amsterdam (1976), pp. 213-216. See also, Hansen, C. M., "*Hansen Solubility Parameters: A User's Handbook*", CRC (2007).

An indication of the rheological compatibility and thermodynamic miscibility of polymers can be provided graphically by the Hansen solubility parameters by using the following steps: 1) calculation of the Hansen solubility parameters for Polymer A and Polymer B as described above; 2) simplification of the Hansen solubility parameters into hydrogen-bonding and non-hydrogen-bonding as described above; 3) plot a 2D solubility parameter map, with a x-axis of Hansen non-hydrogen bonding solubility parameters, and a y-axis of Hansen hydrogen bonding solubility parameters; 4) assessment of the distance between polymer A and polymer B on the 2D solubility parameter map of step 3). If the distance between polymer A and polymer B on the 2D solubility parameter map is large there is low thermodynamic miscibility between the two polymers. If the distance between polymer A and polymer B on the 2D solubility parameter map is small, thermodynamic miscibility is high between polymer A and polymer B (and vice versa). For intermediate distances between polymer A and polymer B on the 2D solubility parameter map, polymer A can be rheologically compatible with polymer B, but may not have thermodynamic miscibility. By pairing polymers with such a Hansen solubility parameters, rheological compatibility and thermodynamic miscibility in the multilayer films can be predicted.

As used herein, "rheologically compatible" or rheological compatibility" means that two flowable polymers have viscosities (e.g., similar or the same viscosities) to prevent viscous encapsulation (e.g., when two molten polymers are flowed in a channel, the lower viscosity molten polymer goes to the channel wall, while the higher viscosity molten polymer goes to the center of a channel).

As used herein, "thermodynamically miscible" or thermodynamic miscibility" means that two flowable polymers can be solubilized in, be dissolved into, be blended with, have an affinity with, form a gradient with, at least a portion of one another by thermodynamic mixing.

As used herein "flowable" refers to the ability to move as in a fluid form (e.g., as a polymer melt).

By providing a polymer A and a polymer B with a differential solubility parameter towards one another ($\Delta\delta_{AB}$) is 2.6 MPa$^{1/2}$≤$\Delta\delta_{AB}$≤3.0 MPa$^{1/2}$; or 2.6 MPa$^{1/2}$<$\Delta\delta_{AB}$<3.0 MPa$^{1/2}$.

For instance, when light at a wavelength of 360 nanometers (nm) to 750 nm is directed towards the multilayer film, a total transmission of the light can be greater than or equal to 89%, at the thickness of the multilayer film. The total transmission a wavelength of 360 nm to 750 nm was measured according to ASTM D1003-00, Procedure A, under D65 illumination, with a 10 degrees observer, using BYK-Gardner haze-gard Dual. The multilayer film can have a haze of less than or equal to 1% at the thickness of the multilayer film, as measured according to ASTM D1003-00, Procedure A, under D65 illumination, with a 10 degrees observer.

The polymer A can comprise a polycarbonate. For instance, the polymer A can comprise a polycarbonate copolymer, such as polycarbonate (PC) and iso- and terephthalate esters of resorcinol (ITR), preferably at a weight ratio of ITR/PC of 20/80, and/or polycarbonate and N-phenylphenol phthaleinylbisphenol (PPP-BP).

The polymer A polycarbonate copolymer can include poly(aromatic ester-carbonate)s comprising bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units. Another specific poly(ester-carbonate) comprises resorcinol isophthalate and terephthalate units and bisphenol A carbonate units, such as those commercially available under the trade name LEXAN™ SLX from SABIC.

Another polymer A polycarbonate copolymer as polymer A includes bisphenol A and bulky bisphenol carbonate units, i.e., derived from bisphenols containing at least 18 carbon atoms, for example 18 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name LEXAN™ copolymer XHT and LEXAN™ copolymer CXT from SABIC.

The polymer B can comprise a semi-crystalline polyester, for example, poly(ethylene terephthalate) (PET). Desirably, the polymer B is poly(ethylene terephthalate) (PET). The PET can be formed from terephthalic acid and a combination of ethylene glycol and diethylene glycol.

Semi-crystallinity is defined as the material having a melting peak determined during a differential scanning calorimetry (DSC) experiment at a heating rate of 10° C./min from 25° C. to 300° C. according to ASTM E794-06. It is noted that the multilayer film has a crystallinity at or below the crystallinity of polymer B.

The multilayer film can comprise a plurality of layers greater than or equal to 4 layers, for instance, greater than or equal to 8 layers. The total number of layers can be 4 to 128 layers, or 8 to 128 layers, or 8 to 64 layers.

A total thickness of the multilayer film can be 35 to 95 μm, such as 40 to 90 μm, or 40 to 80 μm, or 40 to 70 μm. A total thickness of the multilayer film without skin layers or mask films can be 35 to 75 μm, such as 40 to 70 μm, or 40 to 60 μm. The thickness of individual layers can be 425 nanometers (nm) to 12.5 μm (measuring from the middle of the commingled interface to the middle of the adjacent commingled interface).

At the interface of polymer A layer and polymer B layer, there is a commingling of polymer A and polymer B, e.g., forming an interdiffusion region comprising polymer A and polymer B.

A method for producing the above-described multilayer films can include coextruding a polymer A stream and polymer B stream to form the multilayer film. By coextruding polymer A and polymer B in adjacent layers, adhesion is achieved between the layers. The method can include splitting a composite layer stream comprising polymer A stream and polymer B stream from the step of coextruding to obtain two or more sub-streams, repositioning the sub-streams an overlapping manner, and contacting the sub-streams to obtain alternating layers of polymer A and polymer B.

For instance, the method disclosed herein for making a multilayer film can include coextruding two or more feed streams in an overlapping manner to form a composite layer stream, e.g., feed streams comprising polymer A stream and polymer B stream, optionally 2-6 polymers, or 2-4 polymers. The feed streams can be coextruded using an extrusion cycle comprising splitting the composite layer stream into two or more sub-streams which can then be repositioned in an overlapping manner, followed by contacting the sub-streams (e.g., lamination). The extrusion cycle can be repeated until a total number of desired layers is achieved. The total number of layers can be represented by the formula $X(Y^N)$, wherein X represents the number of feed streams, Y represents the number of sub-streams, and N represents a number of times the extrusion cycle is repeated. For instance, the extrusion cycle can produce a multilayer film with polymer A layers and polymer B layers that overlap in an alternating manner and are present in a volume ratio of 20:80 to 80:20, or 40:60 to 60:40, preferably 45:55 to 55:45. Such multilayer films can be formed using the layer multiplication technology and equipment commercially available from Nordson Extrusion Dies Industries LLC, Chippewa Falls, Wis.

The method disclosed herein for making a multilayer film can include contacting two or more feed streams in an overlapping manner forming a composite layer stream, e.g., within a feed block of a co-extrusion apparatus. The two or more feed streams can be overlaid vertically to form a composite layer stream.

Figure 2A:
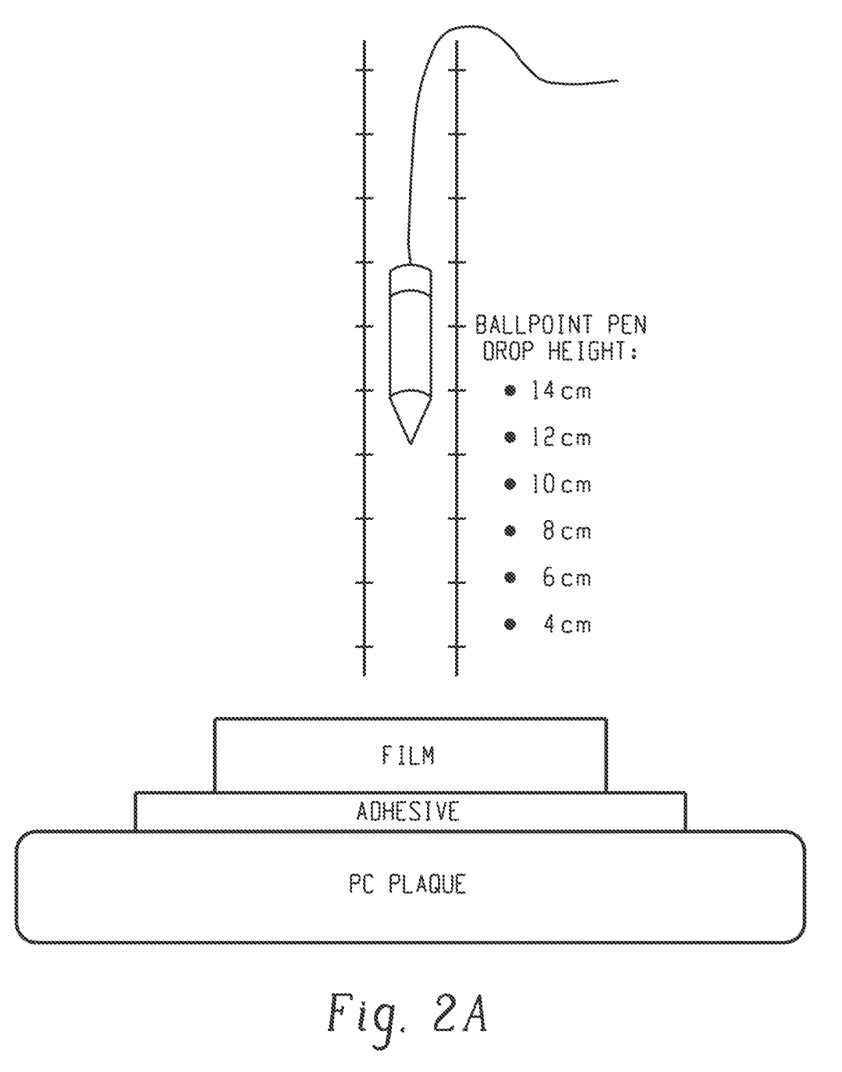
FIG. 2A is a schematic representation of the setup used to study impact resistance in the Examples.
Figure 2B:
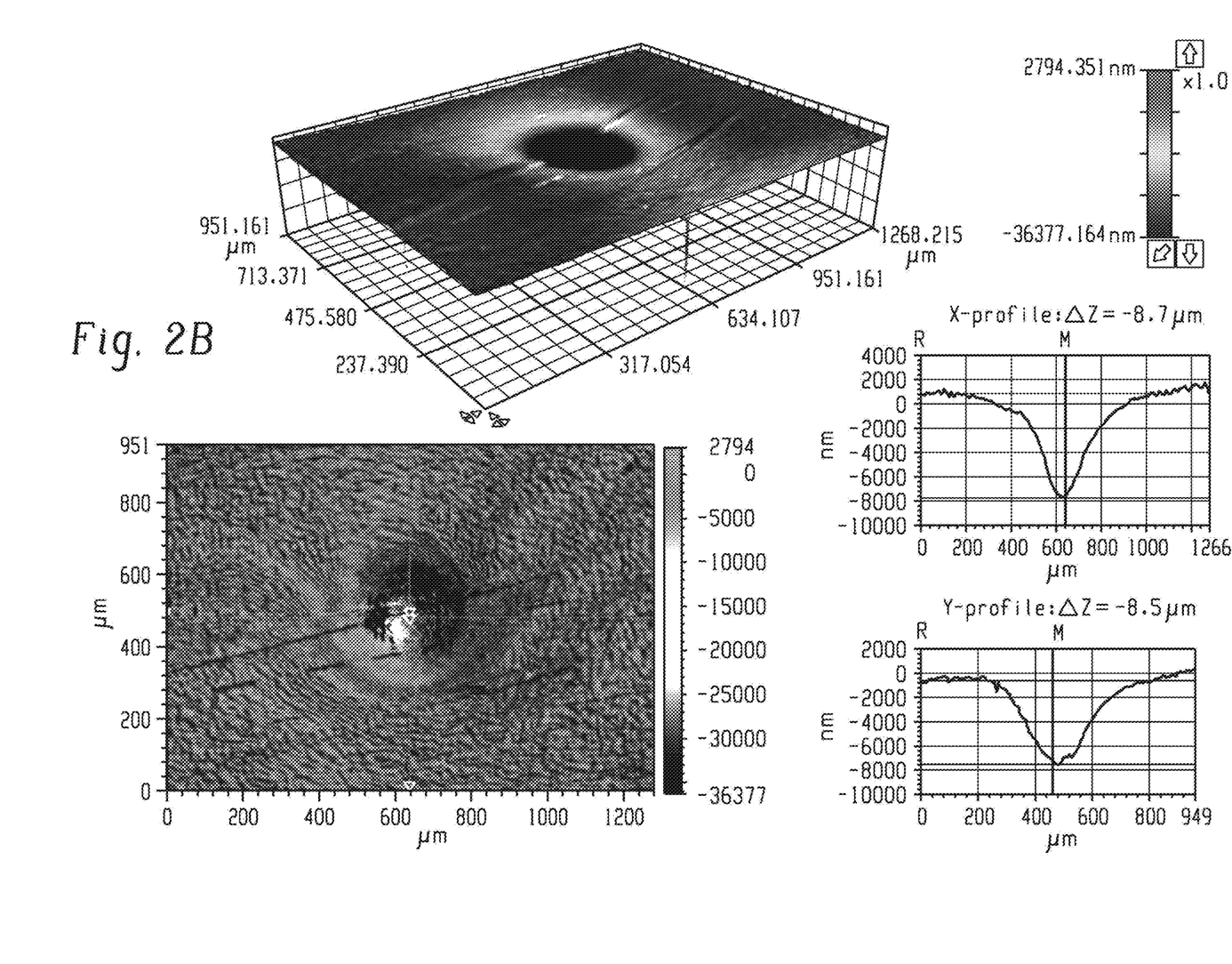
FIG. 2B is an example of data generated using the setup of FIG. 2A.

Once the composite layer stream is formed, it can be processed in an extrusion cycle comprising splitting the composite layer stream into two or more sub-streams. For instance, the composite layer stream can be split vertically into two or more diverging sub-streams, wherein each sub-stream comprises at least a portion of each original feed stream. In other words, each sub-stream comprises a portion of all of the layers of the composite layer stream. The sub-streams can then be repositioned in an overlapping manner. For instance, each sub-stream can travel through its own divergent channel within a co-extrusion apparatus which direct the sub-streams to an overlaid position (e.g., a vertically overlaid position) where the sub-streams contact one another to form a subsequent composite layer stream comprising both of the sub-streams aligned (e.g., vertically) (See FIG. 2). The extrusion cycle combines the two or more sub-streams. For instance, the sub-streams are released from the vertically overlaid channels, thus contacting each other in an overlapping manner. The extrusion cycle can be repeated until a multilayer film having the desired number of layers is achieved.

Once the multilayer film is formed, a skin layer can be applied to one or both sides (e.g., opposing sides) of the multilayer film. The skin layer can have a thickness of 1 to 10 μm. If the skin layer is the same composition as the polymer A or polymer B, the skin layer can become part of the multilayer film. For example, the skin layer can be semi-crystalline polyester (e.g., PET).

Optionally, a mask film can be used on one side or opposing sides of the multilayer film for protection during processing and can be thereafter removed. If the skin layer is to be removed, it can comprise, for example, a polyolefin such as polypropylene. The mask film can have a thickness of 1 to 10 μm.

The total number of layers can be represented by the formula $X(Y^N)$, wherein X represents the number of feed streams, Y represents the number of sub-streams, and N represents a number of times the extrusion cycle is repeated. For instance, the extrusion cycle can produce a multilayer film with polymer A layers and polymer B layers that are distinguishable and overlap in an alternating manner.

The multilayer film can be formed using an extrusion feedblock that enables multilayer arrangements. Using an extrusion feedblock, the polymer A stream and polymer B stream can each be individually split into many (e.g., more than 10) substreams, which are then alternatingly recombined to form the multilayer film. For instance, extrusion feedblocks such as those commercially available from Cloeren Inc., Orange Tex., USA.

For co-extruding polymer A and polymer B, any temperature above the glass transition temperature or melting point of both polymers, and below a temperature at which one of the polymers starts to degrade, can be used. The temperature can be one at which the viscosities of the polymers are closely matched, and the viscosities of both polymers are not too high (as it requires too high pressures to operate the extruders), but also not too low so there is not enough melt strength in forming the film out of the die. For instance, the coextruding can be at a temperature of 200° C. to 350° C., or 220° C. to 320° C., preferably 240° C. to 300° C. In selecting a temperature for co-extruding, the resulting viscosities of polymer A stream and polymer B stream can be matched (e.g., a ratio of 2:1 to 1:2) such that, for example adhesion between adjacent portions of the feed streams is achieved and optionally, such that distortion or viscous encapsulation of the layers is reduced or eliminated.

The coextruded polymer A and polymer B can be maintained such that both the polymer A is above its glass transition temperature (Tg) and polymer B is above its melting point (Tm) for a sufficient period of time to enable the interface of polymer A layer and polymer B layer to commingle e.g., to form the interdiffusion region comprising both polymer A and polymer B. It is understood that the temperature is maintained below a temperature which will degrade the materials such that they don't meet the desired transparency, dynamic flexure, and impact properties.

As used herein, "glass transition temperature" or (Tg) refers to a temperature at which an amorphous polymeric material changes from a hard, solid-like state into a viscous or elastic fluid-like state, as determined according to ASTM E1640-13. As used herein, "melting point" refers to a temperature at which a semi-crystalline or crystalline polymeric material changes from a hard, solid-like state into a viscous or elastic fluid-like state, as determined by differential scanning calorimetry (DSC 8000 from PerkinElmer, UK) at a heating rate of 10° C./min from 25° C. to 300° C. according to ASTM E794-06.

The multilayer film can have a coating on one or both sides (e.g., opposing sides) thereof. The coating can be directly on the outermost polymer layer A, directly on the outermost polymer layer B, or on the skin layer), preferably the coating is on one side of the multilayer film. The polymer coating has a hardness (H) to modulus (E) characterized by nano-indentation. The hardness and modulus can be determined using the Nano-Indenter™ XP (Keysight Technologies, CA, USA) with a three-sided Berkovich diamond tip (end diameter ~50 nm) for the indentation. The load and displacement data obtained in the nano-indentation test is analyzed according to the model developed by Oliver and Pharr (see: W. C. Oliver, G. M. Pharr, J. Mater. Res., 7, (6), 1992, 1564-1583).

The coating can be applied by optionally treating the side(s) of the multilayer film that will receive the coating (e.g., a surface activation treatment such as plasma activation). The coating can then be deposited on the multilayer film; e.g., a precursor solution (e.g., polymer, solvent, and any additive(s)) can be deposited onto the multilayer film via, for example, slot die coating, dip coating, flow coating, spin coating, spray coating, bar coating, knife-edge coating, screen printing, flexography, gravure printing, ink jet printing, chemical vapor deposition, plasma coating, etc. The coating can then be dried and/or cross-linked (thermal or UV curing depending of the mixture used) as is appropriate.

Examples of possible polymer for the coating can include radiation-curable polymers and/or heat curable polymers, such as polyurethane, polysiloxane, acrylic polymers, cellulose ethers and esters, polysaccharides, polyethers, polyesters, epoxy-containing polymers, styrene, polyimide, fluoropolymers, polysulfide, and combinations comprising at least one of the foregoing; e.g., can comprise a copolymer such as styrene-acrylate copolymer, styrene-butadiene copolymer, or acrylonitrile butadiene styrene copolymer.

Some possible coatings include stabilizing coatings (e.g., heat stabilizing, light stabilizing, ultraviolet (UV) light stabilizing, and radiation stabilizing), antistatic coatings, antimicrobial coatings, antireflective coatings, and reflective coatings (e.g., blue light reflective coatings). Optionally, on the other side (e.g., the opposing side) of the multilayer film can be a skin, an adhesive layer, a coating (e.g., for scratch resistance and surface hardness enhancement). For example, the other side of the multilayer film can have an anti-reflective coating.

Additive(s) can be used in the coating to achieve a desired property, with the proviso that the additive(s) are also selected so as to not significantly adversely affect a desired property multilayer film (e.g., transparency, dynamic flexure, and indent depth). Some possible additive(s) include one or more of viscosity modifier, polymer binder, stabilizer(s), nanoparticles, antioxidants, or impact modifier.

The desired coating has a ratio of hardness to modulus (H/E) of less than or equal to 0.1; and greater than or equal to 0.03, preferably greater than or equal to 0.05.

The coating can have a thickness of less than or equal to 25 µm, preferably less than or equal to 15 µm, more preferably less than or equal to 10 µm.

Figure 1:
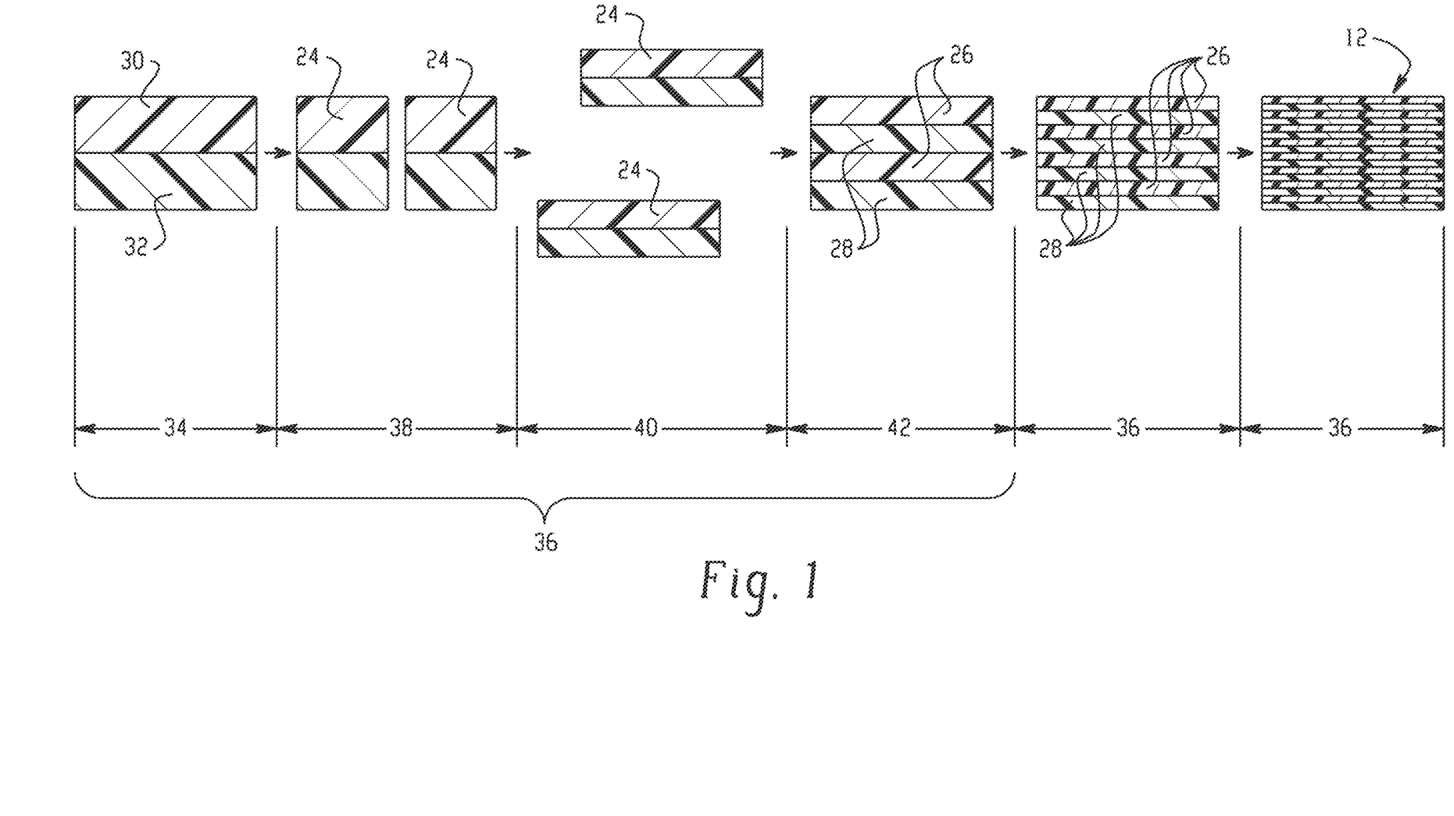
FIG. 1 is a simplified schematic diagram representing a method of making a multilayer film.

Referring now to FIG. 1, two feed streams, polymer A stream 30 and polymer B stream 32, can be contacted in an overlapping manner to form the composite layer stream 34 and simultaneously extruded. Then, in extrusion cycle 36, the composite layer stream 34 can be split 38 into two or more sub-streams 24 which are repositioned 40 in an overlapping manner, and recombined to form single stream 42. The splitting and repositioning is repeated in as many further extrusion cycles 36 as desired until a desired total number of layers is achieved.

The total number of layers can be represented by the formula $X(Y^N)$, wherein X represents the number of feed streams, Y represents the number of sub-streams, and N represents a number of times the extrusion cycle is repeated. For instance, FIG. 1 depicts two feed streams 30 and 32, two sub-streams 24, three extrusion cycles 36, and a multilayer film 12 with 16 total layers. For instance, FIG. 1 depicts polymer A layers 26 and polymer B layers 28 that overlap in an alternating manner and are present in a 1:1 volume ratio.

The multilayer film(s) can be used in an article. For example, the article can be a touch screen (e.g., five-wire resistive touch screen, surface capacitive touch screen, projected capacitive touch screen, surface acoustic wave touch screen, optical imaging touch screen, or infrared touch screen). The article can be a display article with flexure, such as at least one of flexible wristwatch, clothing with integrated display, curved vehicle display, or rollable screen (e.g., a rollable television screen). The article can comprise a cellular phone or a tablet.

Examples of flexible electronic devices include: wearable electronics (such as a watch (e.g., wherein the screen is bent to form around the wrist of the wearer), or a display incorporated into a piece of clothing), medical instrument, a mobile phone or tablet whose screen can be folded to reduce storage space, a television screen (e.g., that can be rolled up into cylinder, or folded for storage).

If the multilayer film comprises the coating, the coating can be located on a side of the multilayer film opposite the electronic component, for example to provide a protective function for the electronic components. The coating can also be located on the multilayer film on the side of the electronic component to provide anti reflective property and/or enhanced light extraction. The coating can also provide other functionalities such as anti-static and/or modify the wetting characteristics of the film.

The following examples are merely illustrative of the multilayer films and articles disclosed herein and are not intended to limit the scope hereof.

Examples

The following components listed in Table 1 were used in the examples. Unless specifically indicated otherwise, the amount of each component is in weight percent in the following examples, based on the total weight of the composition.

TABLE 1

| Acronym | Description | Source |
|---------|-------------|--------|
| PC1 | BPA polycarbonate made by an interfacial process with an MFR at 300° C./1.2 kg, of 25 g/10 min. (ASTM 1238); commercially sold under the trade name LEXAN ™ HF1110 resin. | SABIC |
| PC2 | BPA polycarbonate made by a melt process with an MVR at 250° C./1.2 kg, of 9 cm$^3$/10 min (ISO1133); commercially sold under the trade name LEXAN ™ OQ1028 resin. | SABIC |
| SLX | Copolymer of BPA polycarbonate and iso- and terephthalate esters of resorcinol (20/80 ITR/BPA) (LEXAN ™ SLX2271T resin) | SABIC |
| EXL | Polysiloxane-polycarbonate with a MVR, at 300° C./1.2 kg (ISO1133) of 2 to 30 cubic centimeters per 10 minutes (cm$^3$/10 min); (LEXAN ™ EXL resin) | SABIC |
| CXT | (BPA-PC: PPP-PC 2,3-dihydro-3,3-bis(4-hydroxyphenyl)-2-phenyl-1H-isoindole-1-one) copolymer commercially sold under the trade name LEXAN ™ CXT17 UV resin | SABIC |
| PPC | Copolymer of BPA polycarbonate and isophthaloyl chloride and terephthaloyl chloride; commercially sold under the trade name LEXAN ™ HPH4404 resin | SABIC |
| HFD | Sebacic acid/BPA/PCP polyestercarbonate resin commercially sold under the trade name LEXAN ™ HFD1711 resin | SABIC |
| PP | polypropylene homopolymer with a MFR at 230° C./2.16 kg, of 10 g/10 min (ASTM 1238) commercially sold under the trade name SABIC ™ 520L resin | SABIC |
| PMMA | Poly(methyl methacrylate) with a melt flow index of 7.3 grams/10 minutes (DIAKON ™ CLG902) | Lucite ™ International |
| SPET | Spiroglycol modified amorphous PET (molar ratio of spiroglycol to ethylene glycol is 45 to 55) and terephthalic acid or an ester thereof (AKESTRA ™ 110) | Perstorp and Mistubishi Gas Chemical Co. |
| PET1 | Low viscosity poly(ethylene terephthalate) commercially sold under the trade name ARNITE A02 307; having a crystallinity of about 29%.* | DSM Engineering Plastics |
| PET2 | High viscosity poly(ethylene terephthalate) commercially sold under the trade name ARNITE A06 101; having a crystallinity of about 24%.* | DSM Engineering Plastics |
| PCCD | Poly(1,4-cyclohexanedimethyl-l,4-cyclohexanedicarboxylate) (Neostar ™ 19972 copolyester) | Eastman Neostar ™ |

*measured by DSC (10° C./min. heating rate). Measured on the as received material.

Physical measurements were made using the tests and test methods described below.

Adhesion test was measured using a 21 cm by 29.7 cm sample of the multilayer film. The film was subjected to 140° C. in an oven for 3 hours. After heat exposure, a 1 cm cut was made through the edge of the multilayer film (between the top and bottom surfaces of the multilayer film in a direction parallel to the interface between adjacent layers) with a razor blade, thereby separating the multilayer film and forming a first and second flap of film. Tweezers were then used grip the first flap, while the other flap was secured. Force was then used to pull the flaps apart to propagate layer separation. If the flaps pulled apart to form separate layers, i.e., the layers delaminated, the sample failed. If the flaps could not be pulled apart to form separate layers, e.g., if the multilayer film tears instead of delaminating, the sample passed.

Dynamic Flexibility ("Dyn. Flex") was measured by 180°, 1 hertz (Hz), bending around a 2 mm radius cylinder. A passing result was greater than (>) 200,000 (i.e., 200K) repeated bending without cracking as determined visually with the unaided eye having normal vision (20/20 vision).

Haze ("H") was measured according to ASTM D1003-00, under D65 illumination, with a 10 degrees observer, at the thickness of the multilayer film set forth in the table, using BYK-Gardner haze-gard Dual.

The strain-at-break (in percentage (%)) was measured according to ASTM D882 (2012), based upon the average of 5 samples.

Total Transmission ("T") at a wavelength of 360 to 750 nm, was measured according to ASTM D1003-00, Procedure A, under D65 illumination, with a 10 degrees observer, at the thickness of the multilayer film set forth in the table, using BYK-Gardner haze-gard Dual.

"Impact dent depth test", as used herein is in accordance with "Method and Device for Evaluation of Impact Resistance of Surfaces and Films", by Pieter Janssen et al., IP.com, No. IPCOM000257652D (dated Feb. 27, 2019). The dent generated by the dropping on the multilayer films of a falling object comprising the tip of a ballpoint pen having a 1.0 mm ball tip diameter. For the experiments, the tip of a BIC™ (brand name) Crystal Original ballpoint pen was used. To ensure a uniform impact and make sure that the pen tip impact is perpendicular to the sample surface (i.e. no tilting of the pen occurs during its fall), the tip of the pen is installed on a polymer foam guider of 49.8 mm of diameter and 38 mm height. The guider and pen tip possess a combined weight of approximately 5.4 g. The guider with pen tip is placed inside a steel tube, called the drop tower. The inner diameter of the steel tube was 51 mm, and the inside was polished to reduce any friction with the guider. To produce quantitative data, the guider and pen tip were subsequently dropped from 12 cm height (distance between the end of the tip and the sample surface). The results were analyzed (depth, width, uniformity) by an optical profiler (e.g., BRUKER™ Contour GT-K Optical Profiler) having a measurement type: VSI/VXI, 5× objective lens, 1× scan, white illumination, 0.5% threshold, 20 µm backscan length, 20 µm scan length. Each data point of the present disclosure is the average of six measurements taken at different locations on the surface of the sample. For all multilayer (MLE) samples tested, impact performance was tested on the polymer A (e.g., polycarbonate copolymer or homopolymer) side of the samples. Desirably, no visible mark would be produced on the film by a pen falling from a height of 12 cm. A dent depth of less than (<) 15 μm was considered a pass. The results are set forth in Table. 2.

Hansen solubility parameters, i.e., Hansen polar solubility parameter, Hansen dispersive solubility parameter, and the Hansen hydrogen solubility parameter, can be calculated as described above, by the van Krevelen group contribution method as described in van Krevelen, D. W., "*Prediction of Solubility-Parameter Components*", K. T. Nijenhuis (Ed.), Properties of Polymers, Elsevier, Amsterdam (1976), pp. 213-216. See also, Hansen, C. M., "*Hansen Solubility Parameters: A User's Handbook*", CRC (2007).

Film Production

The multilayer films were produced using Layer Multiplication Technology from Nordson-EDI (Chippewa Falls, Wis.). A total of 4 and 5 splitters, respectively, were used for layer multiplication, which provided 32 and 64, respectively, alternating layers. For all of the multilayered films, a polypropylene skin layer was applied to the multilayer material after layer multiplication, but before the polymer entered a coat hanger die. The function of this polypropylene skin layer was to protect the multilayer structure in the die as well as in the solid state. The polypropylene skin layer was removed prior to performing measurements on the multilayer films.

Two polymer streams were fed into the multiplication units and the feedblock by single screw extruders. A single screw extruder was also used to feed the polymer stream for the skin layer. When producing samples which included PET1, temperatures were set to 270° C. to be well above the melting point of the PET1. When producing samples which included PET2, temperatures were set to 280° C. to be well above the melting point of the PET2. When producing samples which included SPET, temperatures were set to 260° C. to obtain a good viscosity match with the polycarbonate. All other samples were produced at 240° C., which was well above the melting point of all materials, and which obtained a good viscosity match.

The weight loss in the polymer hoppers above the extruders was tracked, which allowed for real-time adjustment to the rotations per minute (rpm) of each extruder to give a constant mass flow of each polymer. A 400 millimeter (mm) wide coat hanger die was used, with a die lip opening of 500 μm. The multilayer films were cut to be 250 mm wide. A total throughput of the system was 20 kilograms per hour (kg/hr), resulting in a throughput of 4 kg/hr for the polycarbonate, a throughput of about 4 kg/hr of the other material (depending on the density difference), and a throughput of 12 kg/hr for the polypropylene.

The uptake speed of the roll stack behind the die was set to 6 meters per minute (m/min) to produce a 50 μm thick multilayer film after removal of the skin layer. Adjustment of the uptake speed was used to adjust the total thickness of the multilayer film.

It is noted that for all examples in Table 2 that list 1 layer, there is a single layer because it is a single material and the layers cannot be distinguished. However, 64 layers of the material were formed together into the single layer using the same equipment and processing conditions set forth above.

TABLE 2

| Ex. No | Polymer A | Polymer B | No. MLE Layers | Strain-at-break (%) | T (%) | H (%) | Dyn. Flex[1] (Cycles) | Impact Depth (μm) | Hansen's Solubility Parameter | |
|---|---|---|---|---|---|---|---|---|---|---|
| | | | | | | | | | $^3\delta_{HA}$ | $^4\delta_{VA}$ |
| 1 | PC1 | — | 1 | 48 | 91.2 | 0.8 | >200K | 26.4 | 6.8 | 17.8 |
| 2 | SPET | — | 1 | 3.2 | 92.0 | 1.4 | <10K | 9.4 | 8.9 | 17.2 |
| 3 | PCCD | — | 1 | 284 | 92.0 | 26.0 | >200K | 28.7 | 7.6 | 17.3 |
| 4 | PET1 | — | 1 | 2.0 | 90.5 | 46.5 | >200K | 3.3 | 9.9 | 18.3 |
| 5 | PMMA | — | 1 | 3.5 | 92 | | <10K | | 8.8 | 16.6 |
| 6 | SLX | — | 1 | >100 | 92 | 0.6 | >200K | 23.8 | 7.2 | 17.9 |
| 7 | EXL | — | 1 | 100 | 92 | 0.4 | >200K | >40** | 6.6 | 16.1 |
| 8 | CXT | — | 1 | >25 | 91 | 0.3 | >200K | 16.2** | 7.0 | 18.4 |
| 9 | PPC | — | 1 | 85 | | | | | 5.9 | 17.7 |
| | | | | | | | | | $^5\Delta\delta_{AB}$ | |
| 10 | PC2 | PMMA | 64 | 10 | 89 | | <23K | 10 | 2.33 | |
| 11 | PC2 | SPET | 64 | 5 | 92 | 1.3 | <16K | 8.9 | 2.18 | |
| 12 | PC1 | PCCD | 64 | 154 | 92 | 2.0 | >200K | 36 | 0.94 | |
| 13 | PC1 | PET1 | 64 | 161 | 91 | 2.9 | >200K | 18.0 | 3.14 | |
| 14 | SLX | PET1 | 64 | 154 | 91 | 0.9 | >200K | 13.8 | 2.73 | |
| 15 | PC1 | PET1 | 32 | 156 | 91 | 0.8 | >200K | 6.9 | 3.14 | |
| 16 | SLX | PET1 | 32 | 144 | 91 | 0.9 | >200K | 8.9 | 2.73 | |
| 17 | EXL | PET1 | 32 | 186 | 91 | 1.1 | >200K | 24.9 | 3.97 | |
| 18 | CXT | PET2 | 32 | 137 | 91 | 0.5 | >200K | 9.3 | 2.90-3.00 | |
| 19 | PPC | PET2 | 32 | 131 | 91 | 1.2 | >200K | 45.5 | 4.0 | |

*Variation of Δδ depends on the exact comonomer ratio.
**Average of six measurements.
[1]Dynamic flexure over a 2 mm radius cylinder.
[2]In case of brittle failure where no yield stress was detected the stress at break is reported.
[3]Hansen hydrogen bonding solubility parameter.
[4]Hansen non-hydrogen bonding solubility parameter was calculated according to Formula (2).
[5]Differential solubility parameter" ($\Delta\delta_{AB}$) was calculated according to Formula (1).
All film samples had a thickness of 50 μm.

As can be seen from Table 2, the combination of dynamic flexibility of greater than or equal to 200,000 cycles, transmission of greater than or equal to 89%, haze less than or equal to 1%, and impact depth of less than or equal to 15 μm, is difficult to obtain and is unpredictable. As is illustrated, multilayer samples comprising polycarbonate and PMMA (Example 10) and polycarbonate and SPET (Example 11) failed the dynamic flexibility tests. Samples, comprising polycarbonate and PCCD (Example 12), polycarbonate and PET (Example 13), EXL and PET (Example 17), and PPC and PET (Example 19), all failed the impact depth tests. Actually, the impact depth of Example 12 was worse than either PC alone (Example 1) or PCCD alone (Example 3).

The use of SLX and PET1 resins (Example 14) in a 64 layer multilayer configuration advantageously provides unique combination of various properties. For example, Example 14 had a strain-at-break of greater than 120% and a dynamic flex life of larger than 200,000 cycles, an impact dent depth of less than 15 μm, a haze of less than 1%, and a transmission of greater than 89%. Example 16, which is the same material combination as Example 14 but differing in the number of layers (32 vs 64) showed the same unique combination of various properties. This illustrates that a broad number of layer configurations are possible for a given material combination. In contrast, the difference in impact performance for a PC1 and PET1 film with a varying number of layers (Example 13 vs Example 15) shows a much stronger influence of the number of layers. This illustrates that a multilayered film consisting of SLX and PET1 is more robust, and has greater design flexibility, and is therefore more preferred.

In addition to the properties of the multilayered films, properties after prolonged exposure to elevated temperatures are also important for the desired applications. Therefore, Examples 13 and 15-18 were tested for adhesion properties. The results are set forth in Table 3.

TABLE 3

| Ex. No | Polymer A | Polymer B | No. MLE Layers | Adhesion Test |
|---|---|---|---|---|
| 13 | PC1 | PET1 | 64 | Fail |
| 15 | PC1 | PET1 | 32 | Fail |
| 16 | SLX | PET1 | 32 | Pass |
| 17 | EXL | PET1 | 32 | Fail |
| 18 | CXT | PET2 | 32 | Pass |

As shown in Table 3, only Example 16 and Example 18 comprising SLX/PET1 and CXT/PET2, respectively, passed the adhesion test. In other words, only these Examples did not delaminate. At the interface off the layers, the SLX and PET1 was commingled, and CXT and PET2 was commingled, respectively. In other words, where the polymer A layer and polymer B layer were in contact, an interdiffusional region existed comprising both the SLX and PET1 or the CXT and PET2 This illustrates the need for sufficient miscibility between the individual materials ($\Delta\delta_{AB}$<3.0 MPa$^{1/2}$). Combined with the loss of properties, particularly pen drop impact performance, in the case of too much miscibility we come to a preferred miscibility range of 2.6<$\Delta\delta_{AB}$<3.0 MPa$^{1/2}$.

Regarding film design, a thicker semi-crystalline PET1 skin layer, having a thickness of 1 to 10 μm is beneficial towards impact resistance compared to the corresponding PC copolymer:PET sample, without significantly affecting other properties. Use of a semi-crystalline polymer like PET1 is beneficial for flexibility.

As is supported by the above examples, the multilayer films disclosed herein exhibiting unique combination of optical, dynamic flexibility, and impact performance with robust temperature stability. The optical performance is exhibited by a transmission at a wavelength of 360 nm to 750 nm of greater than or equal to 89% at the thickness of the multilayer film, as measured according to ASTM D1003-00, under D65 illumination, with a 10 degrees observer; and, preferably by a haze of less than or equal to 1% at the thickness of the multilayer film, as measured according to ASTM D1003-00, under D65 illumination, with a 10 degrees observer. The dynamic flexibility is exhibited by a dynamic flexure of greater than or equal to 200,000 cycles, as determine by bending 180° on a 10 mm radius cylinder at a rate of 1 hertz, preferably greater than or equal to 200,000 cycles, as determine by bending 180° on a 2 mm radius cylinder at a rate of 1 hertz. The impact performance is exhibited by an average impact dent depth of less than or equal to 15 μm, preferably less than or equal to 12 μm, or less than or equal to 10 μm, as determined in accordance with an impact dent depth test and measured using an optical profiler having a 5× objective lens, 1× scan, white illumination, 0.5% threshold, 20 μm backscan length, and 20 μm scan length, wherein the impact dent depth test comprises impacting polymer A side of the multilayer film with a ball point pen tip from a height of 12 cm between the ball point pen tip and the multilayer film, by dropping a 5.4 g polymer foam guider comprising the ball point pen tip onto the multilayer film to form an impact dent, wherein the average impact dent depth is an average of six measurements at different locations on the sample, wherein the ball point pen tip has a 1.0 mm ball tip diameter.

This disclosure further encompasses the following aspects.

Aspect 1: In one embodiment, a multilayer film can comprise: a plurality of layers, preferably 4 layers to 128 layers, The plurality of layers can comprise: (a) a polymer A layer comprising a polycarbonate copolymer wherein the polycarbonate copolymer comprises at least one of: a copolymer of polycarbonate and iso- and terephthalate esters of resorcinol at a weight ratio of the iso- and terephthalate esters of resorcinol to the bisphenol A polycarbonate of 20/80; or copolymer comprising bisphenol A carbonate units and 2-phenyl-3,3'-bis(4-hydroxyphenyl) phthalimidine carbonate units; and a polymer B layer comprising a semi-crystalline polyester; and (b) an interdiffusion region between each polymer A and polymer B; wherein a differential solubility parameter ($\Delta\delta_{AB}$) of polymer A towards polymer B ($\Delta\delta_{AB}$) is 2.6 MPa$^{1/2}$≤$\Delta\delta_{AB}$≤3.0 MPa$^{1/2}$. The multilayer film has a total thickness of 40 μm to 90 μm.

Aspect 2: The multilayer film of Aspect 1, wherein the dynamic flexure, determine by bending 180°, 1 Hz, on a 10 mm radius cylinder, is greater than 200,000 cycles.

Aspect 3: The multilayer film of any one or more of the preceding aspects, wherein the dynamic flexure, determine by bending 180°, 1 Hz, on a 2 mm radius cylinder, is greater than 200,000 cycles.

Aspect 4: The multilayer film of any one or more of the preceding aspects, wherein the multilayer film has an average impact dent depth of less than or equal to 15 μm, preferably less than or equal to 12 μm, or less than or equal to 10 μm, as determined in accordance with an impact dent depth test and measured using an optical profiler having a 5× objective lens, 1× scan, white illumination, 0.5% threshold, 20 μm backscan length, and 20 pin scan length, wherein the impact dent depth test comprises impacting polymer A side of the multilayer film with a ball point pen tip from a height of 12 cm between the ball point pen tip and the multilayer film, by dropping a 5.4 g polymer foam guider comprising the ball point pen tip onto the multilayer film to form an impact dent, wherein the average impact dent depth is an average of six measurements at different locations on the sample, wherein the ball point pen tip has a 1.0 mm ball tip diameter.

Aspect 5: The multilayer film of any one or more of the preceding aspects, wherein the total thickness is 40 µm to 80 µm, or 40 µm to 70 µm.

Aspect 6: The multilayer film of any one or more of the preceding aspects, further comprising a skin layer attached to a side of the multilayer film, preferably to opposing sides of the multilayer film, preferably wherein the skin layer comprises a polyester.

Aspect 7: The multilayer film of Aspect 6, wherein each of the skin layers has a thickness of 1 to 10 µm.

Aspect 8: The multilayer film of Aspect 6 or 7, wherein the skin layer comprises poly(ethylene terephthalate).

Aspect 9: The multilayer film of any one or more of the preceding aspects, comprising a coating, wherein the coating has a hardness (H) and a modulus (E) determined via nano-indentation, and wherein a ratio of hardness to modulus (H/E) is 0.03 to 0.1, preferably 0.05 to 0.1, wherein the coating can be located on at least one of a skin layer, opposing skin layers, on an outermost layer of the multilayer film, or on opposing outermost surfaces of the multilayer film.

Aspect 10: The multilayer film of any one or more of the preceding aspects, wherein the semi-crystalline polyester is poly(ethylene terephthalate) formed from terephthalic acid and a combination of ethylene glycol and diethylene glycol.

Aspect 11: The multilayer film of any one or more of the preceding aspects, wherein the multilayer film has a transmission at a wavelength of 360 nm to 750 nm of greater than or equal to 89% at the thickness of the multilayer film, as measured according to ASTM D1003-00, under D65 illumination, with a 10 degrees observer, and a haze of less than or equal to 1% at the thickness of the multilayer film, as measured according to ASTM D1003-00, under D65 illumination, with a 10 degrees observer.

Aspect 12: The multilayer film of any one or more of the preceding aspects, wherein the multilayer film, minus any skin layers and any mask films has a total thickness of 40 to 70 µm, or 40 to 60 µm.

Article 13: An article comprising the multilayer film of any one or more of the preceding aspects.

Aspect 14: The article of Aspect 13, wherein the article a cellular phone.

Aspect 15: The article of Aspect 13, wherein the article is a tablet.

Aspect 16: The article of Aspect 13, wherein the article is a display article with flexure.

Aspect 17: The article of Aspect 16, wherein the display article is at least one of flexible wristwatch, clothing with integrated display, curved vehicle display, or rollable screen (e.g., a rollable television screen).

Aspect 18: The article of Aspect 13, wherein the article is five-wire resistive touch screen, surface capacitive touch screen, projected capacitive touch screen, surface acoustic wave touch screen, optical imaging touch screen, or infrared touch screen.

Aspect 19: A method for producing the multilayer film of any one or more of Aspects 1-11, comprising: (i) coextruding polymer A and polymer B; splitting the coextruded polymer A and polymer B to obtain two or more sub-streams; repositioning the sub-streams in an overlapping manner, and contacting the sub-streams to obtain alternating layers of polymer A and polymer B; and repeating the preceding steps until the desired number of layers has been attained, and passing the stream through a die to produce the multilayer film; or (ii) separately extruding polymer A and polymer B to form individual polymer streams A and B; splitting the individual polymer streams A and B into more than 3 sub-streams, and recombining the sub-streams to form a recombined stream, alternating between the A and B sub-streams; and passing the recombined stream through a die to produce the multilayer film.

Aspect 20: A method for producing the multilayer film of any one or more of Aspects 1-12, comprising: (e.g., employing multiplication by) coextruding polymer A and polymer B; splitting the coextruded polymer A and polymer B to obtain two or more sub-streams; repositioning the sub-streams in an overlapping manner, and contacting the sub-streams to obtain alternating layers of polymer A and polymer B; repeating the preceding steps until the desired number of layers has been attained, and passing the stream through a die to produce the multilayer film.

Aspect 201: A method for producing the multilayer film of any one or more of Aspects 1-12, comprising: (e.g., employing feed block processing by) separately extruding polymer A and polymer B to form individual polymer streams A and B; splitting the individual polymer streams A and B into more than 3 sub-streams, and recombining the sub-streams to form a recombined stream, alternating between the A and B sub-streams; and passing the recombined stream through a die to produce the multilayer film.

Aspect 22: The method of any of Aspects 19-22, further comprising adding a skin layer to the recombined stream prior to passing it through a die.

Aspect 23: The use of the multilayer film of any of Aspects 1-112 in an electronic device that has a dynamic flexure of greater than or equal to 200,000 cycles, as determined by bending 180° on a 10 mm radius cylinder at a rate of 1 hertz.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context. The terms "first," "second," and the like, "primary," "secondary," and the like, as used herein do not denote any order, quantity, or importance, but rather are used to distinguish one element from another.

Unless otherwise stated to the contrary herein, all test standards are the most recent standard in effect as of Jun. 1, 2018.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this disclosure belongs. A "combination" is inclusive of blends, mixtures, alloys, reaction products, and the like.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A multilayer film comprising:
    (a) a plurality of layers, comprising,
        a polymer A layer comprising a polycarbonate copolymer wherein the polycarbonate copolymer comprises at least one of:
            a copolymer of polycarbonate and iso- and terephthalate esters of resorcinol at a weight ratio of the iso- and terephthalate esters of resorcinol to the polycarbonate of 20/80; or
            copolymer comprising bisphenol A carbonate units and 2-phenyl-3,3'-bis(4-hydroxyphenyl) phthalimidine carbonate units; and
        a polymer B layer comprising a semi-crystalline polyester used to form the film;
    (b) an interdiffusion region between each polymer A and polymer B;
    wherein a differential solubility parameter of polymer A towards polymer B ($\Delta\delta_{AB}$) is $2.6\ MPa^{1/2} \leq \Delta\delta_{AB} \leq 3.0\ MPa^{1/2}$; and wherein the multilayer film has an average impact dent depth of less than or equal to 15 μm as determined in accordance with an impact dent depth test and measured using an optical profiler having a 5×objective lens, 1×scan, white illumination, 0.5% threshold, 20 μm backscan length, and 20 μm scan length;
    wherein the impact dent depth test comprises impacting the multilayer film comprising a polymer A outer layer with a ball point pen tip from a height of 12 cm between the ball point pen tip and the multilayer film, by dropping a 5.4 g polymer foam guider comprising the ball point pen tip onto the polymer A outer layer of the multilayer film to form an impact dent, wherein the average impact dent depth is an average of six measurements at different locations on the sample, wherein the ball point pen tip has a 1.0 mm ball tip diameter;
    wherein the multilayer film has a dynamic flexure of greater than or equal to 200,000 cycles, as determined by bending 180° on a 10 mm radius cylinder at a rate of 1 hertz; and
    wherein the multilayer film, without any skin layers or masking films, has a total thickness of 40 μm to 70 μm;
    wherein the multilayer film has a transmission at a wavelength of 360 nm to 750 nm of greater than or equal to 89% at the thickness of the multilayer film, as measured according to ASTM D1003-00, under D65 illumination, with a 10 degrees observer; and
    wherein the multilayer film has a haze of less than or equal to 1% at the thickness of the multilayer film, as measured according to ASTM D1003-00, under D65 illumination, with a 10 degrees observer.

2. The multilayer film of claim 1, wherein the dynamic flexure, determined by bending 180°, 1 Hz, on a 2 mm radius cylinder, is greater than or equal to 200,000 cycles.

3. The multilayer film of claim 1, wherein a total thickness of the multilayer film is 40 μm to 60 μm.

4. The multilayer film of claim 1, further comprising a skin layer attached to a side of the multilayer film.

5. The multilayer film of claim 4, wherein the skin layer has a thickness of 1 to 10 μm.

6. The multilayer film of claim 1, comprising a coating, wherein the coating has a hardness (H) and a modulus (E) determined via nano-indentation, and wherein a ratio of hardness to modulus (H/E) is 0.03 to 0.1, wherein the coating can be located on at least one of a skin layer, opposing skin layers, on an outermost layer of the multilayer film, or on opposing outermost surfaces of the multilayer film.

7. The multilayer film of claim 1, wherein the semi-crystalline polyester is poly(ethylene terephthalate) formed from terephthalic acid and a combination of ethylene glycol and diethylene glycol.

8. The multilayer film of claim 1, wherein the multilayer film, minus any skin layers and any mask films has a total thickness of 40 to 70 μm.

9. An article comprising the multilayer film of claim 1.

10. The article of claim 9, wherein the article is at least one of a five-wire resistive touch screen, a surface capacitive touch screen, a projected capacitive touch screen, a surface acoustic wave touch screen, an optical imaging touch screen, or an infrared touch screen.

11. The article of claim 9, wherein the article is a display article with curvature or flexure.

12. The article of claim 9, wherein the article is a cellular phone or a tablet.

13. A method for producing the multilayer film of claim 1, comprising:
    (i)
        coextruding polymer A and polymer B;
        splitting the coextruded polymer A and polymer B to obtain two or more sub-streams;
        repositioning the sub-streams in an overlapping manner, and contacting the sub-streams to obtain alternating layers of polymer A and polymer B; and
        repeating the preceding steps until the desired number of layers has been attained; and
        passing the stream through a die to produce the multilayer film; or
    (ii)
        separately extruding polymer A and polymer B to form individual polymer streams A and B;
        splitting the individual polymer streams A and B into more than 3 sub-streams, and
        recombining the sub-streams to form a recombined stream, alternating between the A and B sub-streams; and
        passing the recombined stream through a die to produce the multilayer film.

14. The method of claim 13, further comprising adding a skin layer to the recombined stream prior to passing it through a die.

15. An electronic device comprising the multilayer film of claim 1, wherein the electronic device has a dynamic flexure of greater than or equal to 200,000 cycles, as determined by bending 180° on a 10 mm radius cylinder at a rate of 1 hertz.

16. The multilayer film of claim 1, wherein the polymer A layer comprises the copolymer comprising bisphenol A carbonate units and 2-phenyl-3,3'-bis(4-hydroxyphenyl) phthalimidine carbonate units.

17. The multilayer film of claim 1, wherein the multilayer film comprises 4 layers to 128 layers.

18. The article of claim 9, wherein the article is a flexible wristwatch, clothing with integrated display, curved vehicle display, or rollable screen.

* * * * *